F. P. BLUBAUGH.
DEMOUNTABLE RIM FOR VEHICLE WHEELS.
APPLICATION FILED OCT. 4, 1915.
1,198,317.  Patented Sept. 12, 1916.
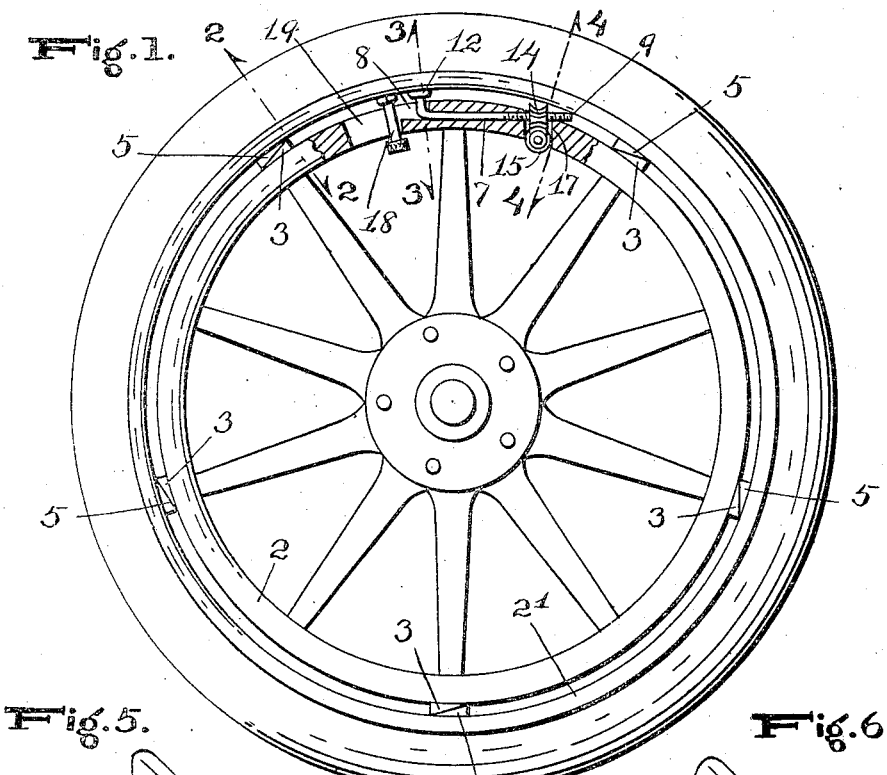
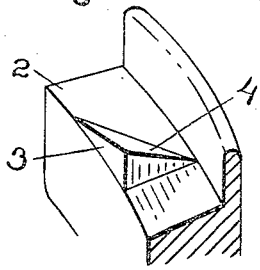
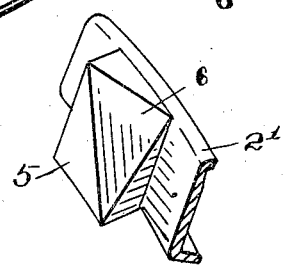
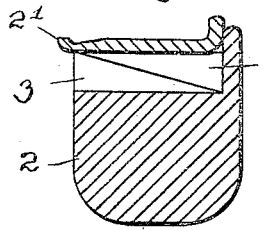
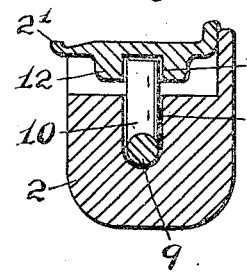
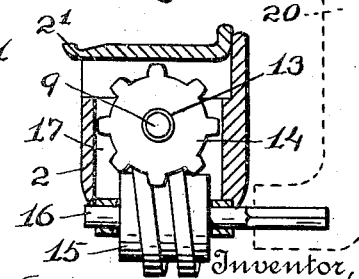
Witness
Stuart Hilder
Inventor,
Francis P. Blubaugh.
E. W. Anderson & Son
his Attorneys

UNITED STATES PATENT OFFICE.

FRANCIS P. BLUBAUGH, OF FORT SCOTT, KANSAS.

DEMOUNTABLE RIM FOR VEHICLE-WHEELS.

1,198,317.  Specification of Letters Patent.  Patented Sept. 12, 1916.

Application filed October 4, 1915. Serial No. 53,987.

*To all whom it may concern:*

Be it known that I, FRANCIS P. BLUBAUGH, a citizen of the United States, resident of Fort Scott, in the county of Bourbon and State of Kansas, have made a certain new and useful Invention in Demountable Rims for Vehicle-Wheels; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to demountable rims for the wheels of vehicles or motor cars, and it consists in the novel construction and combinations of parts, as hereinafter set forth.

The object of the invention is to provide improved means for effecting an inward and radial movement of the rim with relation to the felly, and for locking the rim in position thereupon.

In the accompanying drawings, illustrating the invention, Figure 1 is a side view of a vehicle wheel having the invention applied thereto, and partly in section; Fig. 2 is a section on the line 2—2, Fig. 1; Fig. 3 is a section on the line 3—3, Fig. 1; Fig. 4 is a section on the line 4—4, Fig. 1; Fig. 5 is a detail perspective view of a portion of the felly, showing one of the cam lugs thereof, and Fig. 6 is a similar view of a portion of the rim, showing one of the cam lugs thereof.

In these drawings the numeral 2 designates the wheel felly, and 2' is the rim, said felly having a plurality of lugs 3, 3, spaced apart and provided each with an outer cam surface 4, rising both circumferentially and laterally or inwardly, the rim being provided also with a similar number of lugs 5, 5, provided with cam surfaces 6, inclined oppositely to those of the lugs 3, with which they are designed to be engaged.

The wheel felly is provided with a circumferentially closed seat or aperture 7, tangential with relation to the same and terminating at one end in a recess or notch 8, opening outwardly, a threaded bolt 9 being engaged with said aperture and having an outwardly turned or hooked radial end 10, engaged with an open-bottom seat 11 of a lug 12 projecting inwardly from the inner circumferential surface of the rim. The threaded bolt is engaged with the threaded aperture 13 of a worm wheel 14, said wheel having engagement with a worm 15, the shaft 16 of which has a bearing in the felly, the worm wheel being disposed transversely with relation to said felly, and the worm and worm wheel being located in a transverse aperture or opening 17 of the felly. The valve neck 18 of the inner tube of the tire is located in a radial opening or aperture 19 of the felly, immediately adjacent to the notch 8.

The outer extremity of the end wall of the valve opening 19 farthest removed from the tangential aperture 7 is substantially in line with the inner side wall or bottom of said aperture.

In the application of the device, the hooked bolt being first slid into engagement with the tangential aperture of the felly and the worm wheel engaged with the thread of the bolt and with the worm, it is only required to lay the rim 2' upon the top of the felly, to engage the seat of the lug 12 with the hooked end of the bolt and the valve neck with the opening of the felly, shove the rim at the bottom inwardly upon the felly and turn the worm wheel by the application of a crank 20 to its shaft, when the bolt will be moved endwise and, through its engagement with the rim, the rim will be moved circumferentially, to cause the cam surface of the lugs of the rim to move upon the cam surfaces of the lugs of the felly, the effect being to move the rim, with the tire thereupon, inwardly to position upon the felly, and to frictionally lock the rim in place. The rim is as readily disengaged from the felly by turning the shaft of the worm wheel reversely.

The invention is designed to facilitate taking the rim from and replacing it in position upon the felly in a short space of time. There being but one bolt employed, danger of loosening of the parts through shocks or jars is reduced.

I claim:

In a vehicle wheel, a felly provided with a radial valve opening, a transverse opening, a tangential aperture closed circumferentially and communicating at one end with said valve opening and at the other end with said transverse opening, the inner side wall of said tangential aperture being substantially in line with the outer extremity of the end wall of said radial opening farthest removed therefrom, a threaded bolt in said aperture having an angularly bent end, a worm wheel in said transverse opening engaging the thread of said bolt and a worm engaging said worm wheel, a rim having a recess seat for the bent end of said bolt, and coöperating means upon said felly and upon said rim whereby when said bolt is adjusted and the rim circumferentially moved upon the felly the rim will be moved laterally inwardly and frictionally locked.

In testimony whereof I affix my signature in the presence of two witnesses.

FRANCIS P. BLUBAUGH.

Witnesses:
  JAMES G. SHEPPARD,
  C. H. PAMER.